(12) United States Patent
Simonot et al.

(10) Patent No.: US 7,202,295 B2
(45) Date of Patent: Apr. 10, 2007

(54) RUBBER COMPOSITION BASED ON DIENE ELASTOMER AND A REINFORCING SILICON CARBIDE

(75) Inventors: Laure Simonot, Greenville, SC (US); Thierry Chartier, Feytiat (FR); Emmanuel Custodero, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/611,556

(22) Filed: Jul. 2, 2003

(65) Prior Publication Data

US 2004/0030017 A1 Feb. 12, 2004

Related U.S. Application Data

(63) Continuation of application No. PCT/EP01/15165, filed on Dec. 20, 2001.

(30) Foreign Application Priority Data

Jan. 2, 2001 (FR) .................................. 01 00049

(51) Int. Cl.
*C08K 3/34* (2006.01)
*B60C 1/00* (2006.01)
*C08L 9/00* (2006.01)

(52) U.S. Cl. ...................... 524/443; 524/262; 524/430; 524/492; 524/493; 524/495; 524/496; 524/571; 524/573; 524/575; 524/575.5

(58) Field of Classification Search ................ 524/493, 524/492, 496, 430, 438, 443
See application file for complete search history.

(56) References Cited

U.S. PATENT DOCUMENTS 4,714,734 A * 12/1987 Hashimoto et al. ......... 524/496
6,121,346 A 9/2000 Visel et al.
6,469,089 B2 * 10/2002 Wang et al. ................ 524/492

FOREIGN PATENT DOCUMENTS

| DE | 195 39 218 A1 | 5/1996 |
|---|---|---|
| EP | 0 940 428 A1 | 9/1999 |
| WO | 99/28376 | 6/1999 |
| WO | 01/27192 A1 | 4/2001 |

OTHER PUBLICATIONS

Ciullo et al, The Rubber Formulary, Norwich NY, Noyes Publications, 1999, pp. 26-32. TS 1890.C58.*

* cited by examiner

*Primary Examiner*—Vasu Jagannathan
*Assistant Examiner*—Vickey Ronesi
(74) *Attorney, Agent, or Firm*—Buchanan Ingersoll & Rooney PC

(57) ABSTRACT

A rubber composition usable for the manufacture of tires, based on at least one diene elastomer, a reinforcing inorganic filler and a coupling agent providing the bond between the inorganic filler and the elastomer, wherein said inorganic filler comprises a silicon carbide having the following characteristics:

(a) a BET specific surface area of between 20 and 200 m²/g;
(b) an average particle size (by mass), $d_w$, of between 10 and 350 nm.

Tires or semi-finished products for tires such as treads comprising said rubber composition.

72 Claims, 5 Drawing Sheets

RUBBER COMPOSITION BASED ON DIENE ELASTOMER AND A REINFORCING SILICON CARBIDE

This is a continuation of PCT application No. PCT/EP01/15165 (WO 2002/53634 A1), filed Dec. 20, 2001.

BACKGROUND AND SUMMARY

The present invention relates to diene rubber compositions usable for the manufacture of tires or semi-finished products for tires, in particular of treads for these tires, and to reinforcing fillers capable of reinforcing such rubber compositions.

So as to reduce fuel consumption and the pollution emitted by motor vehicles, major attempts have been made by tire designers to obtain tires having all of the following: very low rolling resistance, improved adhesion both on dry ground and on wet or snow-covered ground, and very good wear resistance.

Numerous solutions have thus been proposed to lower the rolling resistance and to improve the adhesion of tires, but these generally result in a very great decline in the wear resistance. In particular, it is well known that although the incorporation of conventional white fillers such as, for example, conventional silicas or aluminas, chalk, talc, clays such as bentonite or kaolin, in rubber compositions used for the manufacture of tires and in particular of treads, does result in a reduction in the rolling resistance and an improvement in adhesion to wet, snow-covered or icy ground, it also results in an unacceptable decline in the wear resistance, linked to the fact that these conventional white fillers do not have a sufficient reinforcement ability with respect to such rubber compositions. For this reason, these white fillers are generally referred to as non-reinforcing fillers, also referred to as inert fillers.

One effective solution to this problem has been described in particular in patent applications EP-A-0501227, EP-A-0735088 or WO99/02602, which disclose diene rubber compositions reinforced with precipitated silicas of high dispersibility (so-called "HD" silicas for "highly dispersible silica"), which make it possible to manufacture treads having a significantly improved rolling resistance, without adversely affecting the other properties, in particular those of grip, endurance and in particular wear resistance. Other compositions having such a compromise of contradictory properties are also described in applications EP-A-0 810 258 and WO99/02602, with specific aluminous fillers of high dispersibility as reinforcing white fillers.

However, the rubber compositions that contain these specific white fillers, even when they are of a highly dispersible type, remain more difficult to work ("processability") than rubber compositions filled conventionally with carbon black, because for reasons of mutual attraction these white filler particles have an irritating tendency to agglomerate together within the elastomeric matrix. These interactions tend to increase the consistency of the compositions in the uncured state and therefore to make them more difficult to work compared with conventional compositions filled with carbon black; they also have the consequence of limiting the dispersion of the filler and hence the reinforcing properties to a substantially lower level than that which it would be theoretically possible to achieve if all the (white filler/elastomer) bonds that could be created during the thermomechanical kneading operations were in fact obtained.

Furthermore, these inorganic fillers of siliceous or aluminous type also have the known drawback of significantly disrupting the vulcanization kinetics of the elastomeric compositions, compared with conventional compositions filled with carbon black. In particular, in the case of silicas, it is known that the resulting longer curing times may adversely affect the industrial processing of the elastomeric compositions, like that of the rubber articles containing them.

Now, the Applicants have discovered during their research that there are specific inorganic fillers, other than those mentioned above, which can also be used in the rubber compositions as true reinforcing fillers, that is to say, are capable of replacing conventional carbon blacks for tires. Unexpectedly, these specific inorganic fillers offer not only excellent processing ability to the rubber compositions containing them, but also very great dispersibility, both similar to those available with carbon blacks. They furthermore make it possible to overcome the aforementioned drawback relating to the curing kinetics, specific to the reinforcing white fillers such as silicas or aluminas.

Consequently, a first subject of the invention relates to a rubber composition based on at least (i) a diene elastomer, (ii) a reinforcing inorganic filler, (iii) a coupling agent providing the bond between the reinforcing filler and the elastomer, characterized in that said inorganic filler comprises a silicon carbide (hereafter referred to as "reinforcing silicon carbide") having the following characteristics:

(a) a BET specific surface area of between 20 and 200 $m^2/g$;

(b) an average particle size (by mass), ($d_w$), of between 10 and 350 nm.

It is known that, conventionally, silicon carbides have been used essentially in treads of tires to improve the grip on snow-covered or icy ground (see for example FR-A-655 105, FR-A-2 218 209, FR-A-2 293 325 or DE-A-2 457 446, DE-A-2 355 466, DE-A-2 457 446, DE-A3 218 124, EP-A-0 442 155, EP-A-0 885 925, JP-A-1985/258235, JP-A-1987/091304, JP-A1988/151506, JP-A-1990/091137, JP-A-1990/135241, JP-A-1990/266704, JP-A-1991/252432 or U.S. Pat. Nos. 5,162,395, US-A-3,878,147, US-A-5,223,333, US-A-5,733,650). In all these documents, the particles of silicon carbide, which are chosen for their coarse size and their very great hardness, have the function not of reinforcement, but of improving the grip by a well-known "claw" effect on snow or ice. Furthermore, it is essential to note that these conventional silicon carbides, which are generally present in a very small proportion, are always added to rubber compositions which furthermore contain a true reinforcing filler such as carbon black and/or silica.

The subject of the invention is also a process for obtaining a rubber composition usable for the manufacture of tires, in which there are incorporated in at least one diene elastomer, at least a reinforcing inorganic filler and a coupling agent providing the bond between the reinforcing inorganic filler and the elastomer, this process being characterized in that said inorganic filler comprises a silicon carbide having the following characteristics:

(a) a BET specific surface area of between 20 and 200 $m^2/g$;

(b) an average particle size (by mass), $d_w$, of between 10 and 350 nm, and in that the entire mixture is kneaded thermomechanically, in one or more stages, until a maximum temperature of between 110° C. and 190° C. is reached.

Another subject of the invention is the use of a rubber composition according to the invention for the manufacture of rubber articles, in particular tires or semi-finished rubber products intended for such tires, these semi-finished articles being selected in particular from among the group comprising treads, underlayers intended for example to be positioned beneath these treads, crown plies, sidewalls, carcass plies, beads, protectors, inner tubes and airtight internal rubbers for tubeless tires.

The composition according to the invention is particularly suited to the manufacture of treads for tires intended to be fitted on passenger vehicles, vans, 4×4 vehicles (having 4 driving wheels), two-wheeled vehicles, "heavy vehicles" (that is to say subway trains, buses, road transport machinery (lorries, tractors, trailers), off-road vehicles), aircraft, construction, agricultural or handling machinery, these treads being able to be used in the manufacture of new tires or for recapping worn tires.

The subject of the invention is also these tires and these semi-finished rubber products themselves, in particular these treads, when they comprise a rubber composition according to the invention.

Another subject of the invention is the use, as reinforcing filler, of a reinforcing silicon carbide as defined above in a diene rubber composition.

Finally, another subject of the invention is a process for reinforcing a diene rubber composition, characterized in that a reinforcing silicon carbide as defined above is incorporated in this composition in the uncured state by thermomechanical kneading.

BRIEF DESCRIPTION OF THE DRAWINGS

The invention and its advantages will be readily understood in the light of the description and examples of embodiment which follow, and in the accompanying figures, in which.

DETAILED DESCRIPTION

I. Measurements and Tests Used

I-1. Characterisation of the Reinforcing Fillers

Figure 1:
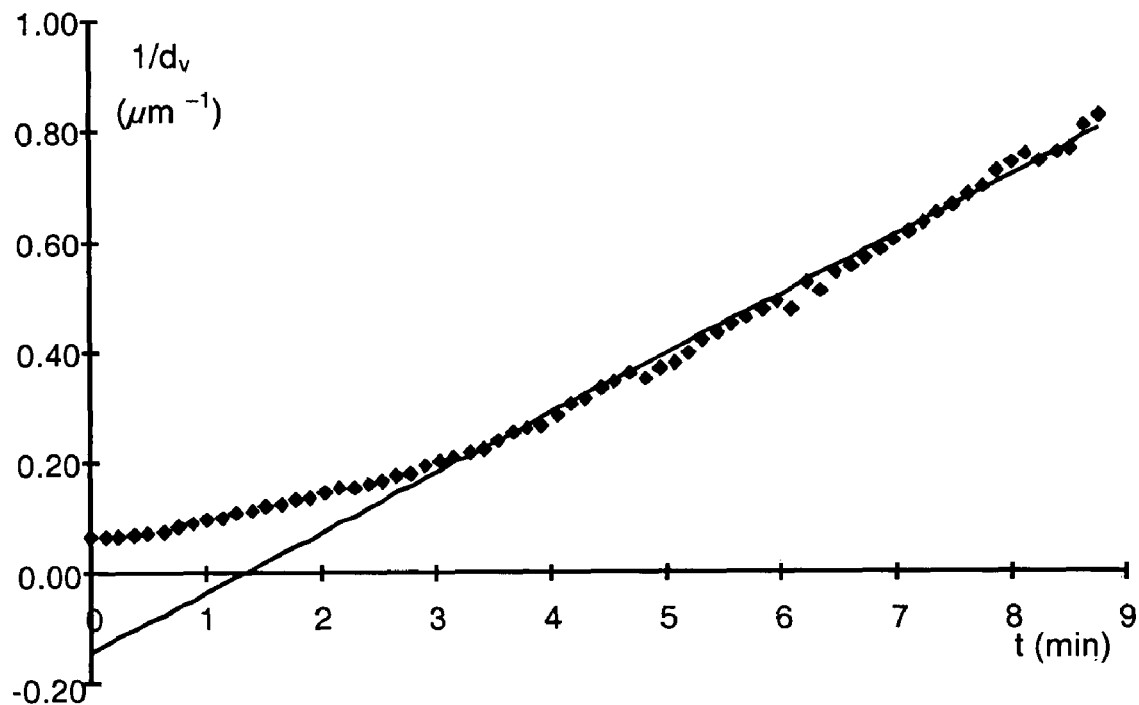
FIGS. 1–4 show curves of the evolution in the size of the agglomerates during ultrasound generation using the device of FIG. 9, for fillers whether or not in accordance with the invention, from which curves the disagglomeration rates α are determined.
Figure 2:
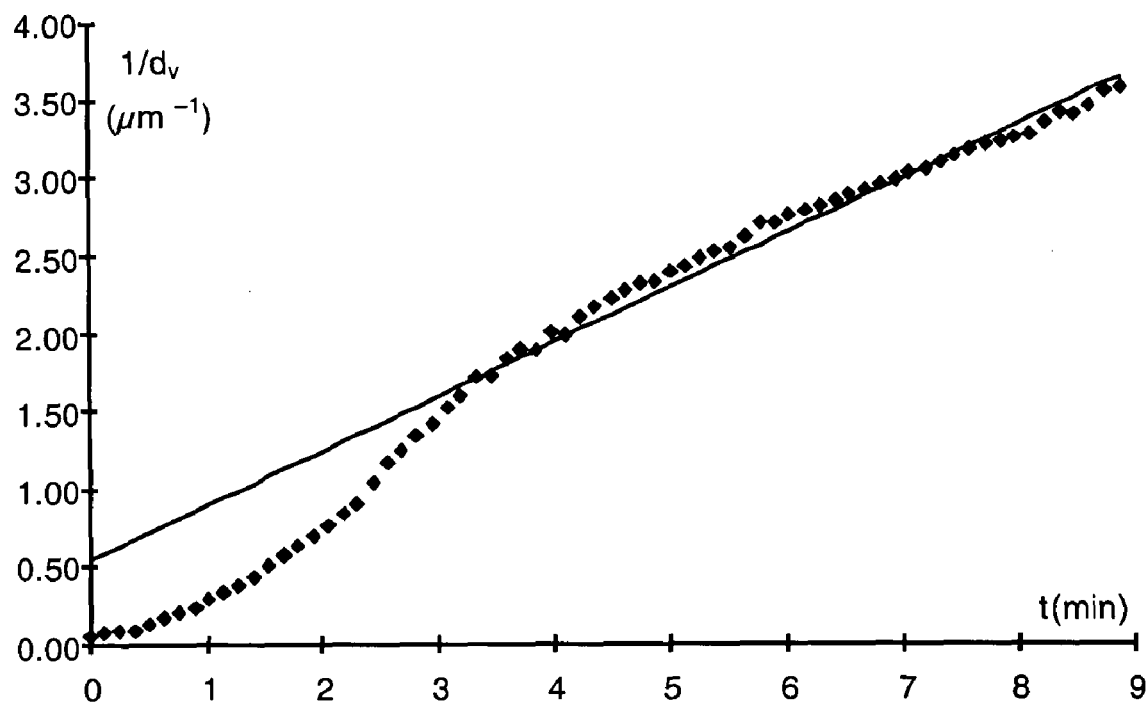
Figure 3:
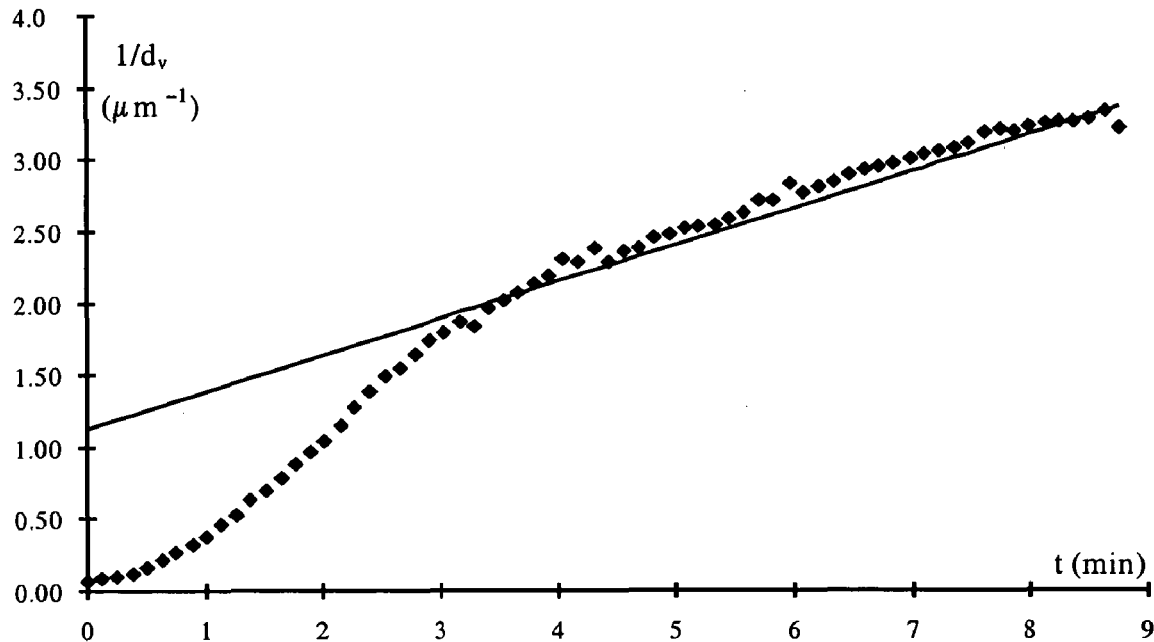
Figure 4:
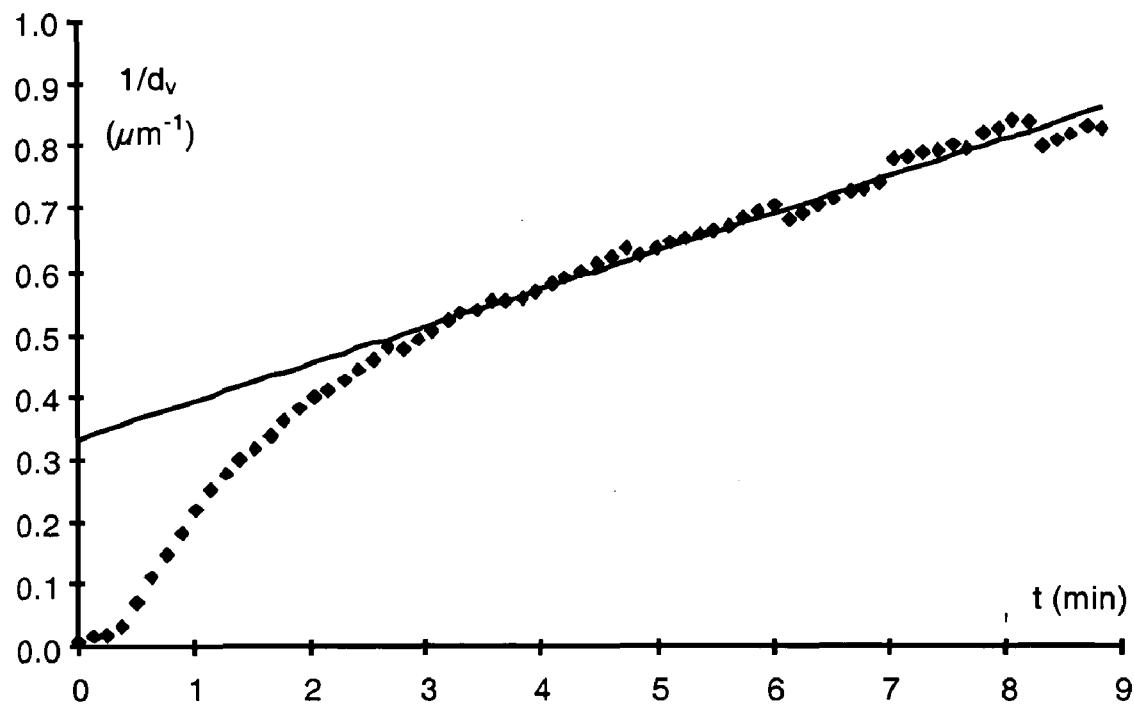

The fillers described hereafter consist in known manner of agglomerates of particles, which are liable to disagglomerate into these particles under the effect of an external force, for example under the action of mechanical working or ultrasound. The term "particle" used in the present application must be understood in its usual generic sense of "aggregate" (also referred to as "secondary particle"), and not in the sense of a possible elementary particle (also referred to as "primary particle") which may form, if applicable, part of this aggregate; "aggregate" is to be understood, in known manner, to mean the non-splittable unit (i.e., which cannot be cut or divided) generally formed of elementary (primary) particles which are aggregated together, produced during synthesis of the filler.

These fillers are characterized as indicated hereafter.

a) BET Specific Surface Area:

The BET specific surface area is determined by adsorption of gas using the method of Brunauer-Emmett-Teller described in "*The Journal of the American Chemical Society*" Vol. 60, page 309, February 1938), more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17].

b) Average Particle Size $d_W$:

The average size (by mass) of the particles, $d_W$, is measured conventionally after ultrasound dispersion of the filler to be analysed in an aqueous solution of 0.01 mol/l sodium hydroxide (approximately 0.4% by weight).

Measurement takes place using a optical detection centrifugal sedimentometer type "DCP" ("Disc Centrifuge Photosedimentometer"), sold by Brookhaven Instruments, a known device used in particular for characterising particles of carbon black. The apparatus is equipped with an LED source which emits in the spectral band of between 600 and 700 nm.

The operating method is as follows. A suspension is produced of 3 to 6 mg (for example, 5 mg is suitable in the majority of cases) of sample of filler to be analysed in 40 ml of aqueous solution containing 0.01 mol/l of NaOH as suspension stabiliser, by action over 8 minutes, at 60% power (60% of the maximum position of the "output control"), of a 1500 W ultrasound probe (Vibracell ¾-inch ultrasound generator sold by Bioblock under the reference M75450). To limit heating during ultrasound generation, the suspension is preferably placed in a bath of cold water (for example at a temperature of 5 to 10° C.). After ultrasound generation, 15 ml of the suspension is introduced into the rotating disc; after sedimentation for 120 minutes, the mass distribution of the particle sizes and the average size by mass of the particles $d_w$ are calculated in known manner by the software of the "DCP" sedimentometer ($d_W = \Sigma(n_i d_i^5)/\Sigma (n_i d_i^4)$) where $n_i$=number of objects of the size class or diameter $d_i$) by applying a specific optical correction taking into account the complex refractive index of the filler analysed (for example n*=2.61+1.00.i for silicon carbide), the refractive index of the suspension medium and the spectral characteristics of the source/detector pair which are provided by Brookhaven Instruments. The refractive index of the suspension medium as a function of the wavelength of the LED source is obtained in known manner, by linear interpolation between the values of refractive indices of water at 20° C.: 1.3322 to 620 nm and 1.3305 at 690 nm. This optical correction is generated by means of the program DCP_SCAT.exe from Brookhaven Instruments.

c) Disagglomeration Rate: α

The disagglomeration rate, (α), is measured in what is called the "ultrasound disagglomeration test", at 20% power of a 600 W (watt) probe. This test, of known principle, makes it possible to measure continuously the evolution of the average size (by volume) of the agglomerates of particles during ultrasound generation (see WO99/28376, WO99/28380, WO99/28391). Given the very small size of the objects observed, the operating method was adapted by using not the method of Fraunhofer but in the present case that of Mie.

The setup used is formed of a laser granulometer (type "Mastersizer S", sold by Malvern Instruments—He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600 W ½ inch ultrasound generator type Vibracell sold by Bioblock under the reference M72412).

A small quantity (20 mg) of filler to be analysed is introduced into the preparer with 160 ml of an aqueous solution of $NH_4OH$, the rate of circulation being set at its maximum (approximately 3 liters per minute). The solution of $NH_4OH$ is prepared with 5 or 10 ml of $NH_4OH$ with 25% by mass of $NH_3$ (for example product from Fluka referenced 09860) diluted in 1000 ml of water, according to the BET surface area of the filler (5 ml for BET values at most equal to 100 m$^2$/g, 10 ml is sufficient for any BET surface area).

At least three consecutive measurements are made to determine the initial mean diameter (by volume) of the agglomerates, referred to as $d_V[0]$, in accordance with the known Mie calculation method [Malvern 3TJD calculation matrix, established with a complex refractive index (for example n*=2.61+1.00.i for silicon carbide)]. The ultrasound generation is then set at a power of 20% (or 20% of the maximum position of the "tip amplitude") and the evolution of the mean diameter in volume $d_V[t]$ as a function of the time "t" is monitored for about 9 minutes with one measurement approximately every 10 seconds. After an induction period (about 3 minutes), it was noted that the reciprocal of the mean diameter in volume $1/d_V[t]$ varies linearly, or substantially linearly, with the time "t" (stable disagglomeration conditions). The disagglomeration rate α is calculated by linear regression of the curve of evolution of $1/d_V[t]$ as a function of the time "t", within the zone of stable disagglomeration conditions (generally, between about 3 and 9 minutes). It is expressed in $\mu m^{-1}/s$.

Figure 9:
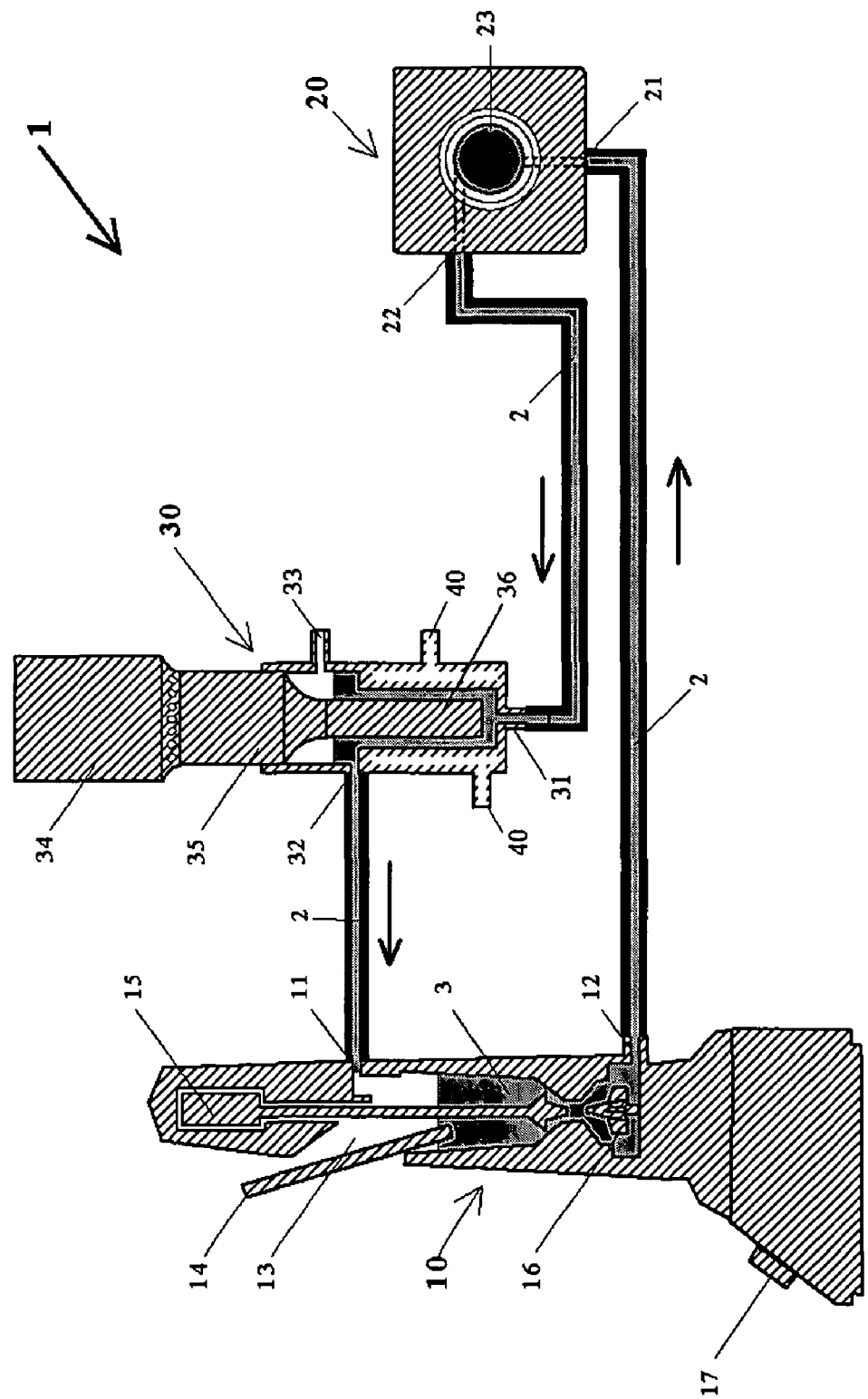
FIG. 9 is a diagram of a device suitable for measuring the ultrasound disagglomeration rate (α) of a filler in the form of agglomerates of particles.

FIG. 9 shows a measuring device which can be used for performing this ultrasound disagglomeration test. This device consists of a closed circuit 1 within which a flow 2 of agglomerates of particles suspended in a liquid 3 can circulate. This device essentially comprises a sample preparer 10, a laser granulometer 20 and a treatment cell 30. A vent to atmospheric pressure (13, 33), at the level of the sample preparer 10 and of the treatment cell 30 itself, permits continuous elimination of the air bubbles which form during ultrasound generation (i.e. the action of the ultrasonic probe).

The sample preparer 10 ("Malvern Small Sample Unit MSX1") is intended to receive the sample of filler to be tested (in suspension in the liquid 3) and to send it through the circuit 1 at the pre-controlled speed (potentiometer 17), in the form of a flow 2 of liquid suspension. This preparer 10 consists simply of a receiving tank which contains, and through which circulates, the suspension to be analysed. It is equipped with a stirrer motor 15 of variable speed in order to prevent sedimentation of the agglomerates of particles of the suspension; a centrifugal mini-pump 16 is intended to circulate the suspension 2 in the circuit 1; the entrance 11 to the preparer 10 is connected to the open air via an opening 13 intended to receive the sample of filler to be tested and/or the liquid 3 used for the suspension.

To the preparer 10 there is connected a laser granulometer 20 ("Mastersizer S"), the role of which is to measure continuously, at regular intervals, the average size by volume "$d_V$" of the agglomerates as the flow 2 passes, by means of a measuring cell 23 to which are coupled the automatic recording and calculation means of the granulometer 20. It should be recalled here briefly that laser granulometers utilise, in known manner, the principle of diffraction of light by solid objects suspended in a medium, the refractive index of which differs from that of the solid. In practice, it is sufficient to measure the amount of light diffracted for different angles of diffraction to be able to determine in known manner, either by the Fraunhofer theory, or by the Mie theory, according to the size of the objects observed, the size distribution (by volume) of the sample, $d_V$ corresponding to the average size by volume of this distribution ($d_V = \Sigma(n_i d_i^4)/\Sigma(n_i d_i^3)$) with $n_i$ being the number of objects of the size class or diameter $d_i$).

Inserted between the preparer 10 and the laser granulometer 20 there is, finally, a processing cell 30 equipped with an ultrasonic probe 35 (converter 34 and probe head 36) intended continuously to break up the agglomerates of particles as the flow 2 passes.

The processing cell 30 is arranged between the outlet 22 of the granulometer 20 and the inlet 11 to the preparer 10, such that, during operation, the flow 2 of particles emerging from the preparer 10 first passes through the laser granulometer 20 before entering the processing cell 30. This arrangement has two major advantages for measurements: firstly, the air bubbles due to the action of the ultrasonic probe are eliminated on passing through the preparer 10 (which is in the open air), that is to say, before entering the granulometer 20, and they therefore do not upset the laser diffraction measurement; secondly, the homogeneity of the suspension is improved by first passing through the preparer 10.

The treatment cell 30 is furthermore arranged such that the flow 2 of particles which penetrates therein, via an inlet 31, first passes in front of the head 36 of the ultrasonic probe 35; this unconventional arrangement (the flow 2 entering from the bottom 31 of the cell, and not from the top 32) has the following advantages: first of all, all the circulating suspension 2 is forced to pass in front of the end 36 of the ultrasonic probe 35, which is the zone most active in terms of disagglomeration; secondly, this arrangement permits a first degassing after ultrasound generation in the body of the treatment cell 30 itself, the surface of the suspension 2 then being in contact with the atmosphere by means of a tube 33 of small diameter.

The flow 2 is preferably thermostatically controlled by means of a cooling circuit 40 arranged, at the level of the cell 30, in a double casing surrounding the probe 35, the temperature being controlled, for example, by a heat sensor 14 immersed in the liquid 3 at the level of the preparer 10. The arrangement of the various elements of the measuring device is optimised so as to restrict as far as possible the circulating volume, that is to say, the length of the connecting tubes (for example, flexible tubes).

I-2. Characterisation of the Rubber Compositions

The rubber compositions are characterized, before and after curing, as indicated below.

a) Mooney Plasticity:

An oscillating consistometer such as described in French Standard NF T 43-005 (1991) is used. The Mooney plasticity is measured in accordance with the following principle: the raw composition (i.e. before curing) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton.meter).

b) Tensile Tests:

These tests make it possible to determine the elasticity stresses and the properties at break. Unless indicated otherwise, they are effected in accordance with French Standard NF T 46-002 of September 1988. The true secant moduli (i.e. calculated reduced to the real section of the test piece), expressed in MPa, at 10% elongation (moduli therefore marked M10 and E10, respectively), 100% elongation (moduli marked M100 and E100, respectively) and 300% elongation (moduli marked M300 and E300, respectively), are measured either in a first elongation (i.e. without an accommodation cycle—the moduli are then marked "M") or in a third elongation (i.e. after two accommodation cycles—the moduli are then marked "E").

The breaking stresses (in MPa) and the elongations at break (in %) are also measured. All these tensile measurements are effected under normal conditions of temperature (23±2° C.) and humidity (50±5% relative humidity), in accordance with French standard NF T 40-101 (December 1979).

Processing the tensile data recorded also makes it possible to plot the curve of the modulus as a function of the elongation (see attached FIGS. 5 to 8), the modulus used here being the true secant modulus measured in a first elongation (modulus "M").

c) Dynamic Properties:

The dynamic properties $\Delta G^*$ and $\tan(\delta)_{max}$ are measured on a viscoanalyser (Metravib VA4000), in accordance with ASTM Standard D 5992-96. The response of a sample of vulcanized composition (cylindrical test piece of a thickness of 4 mm and a section of 400 $mm^2$), subjected to an alternating single sinusoidal shearing stress, at a frequency of 10 Hz, under normal conditions of temperature (23° C.) in accordance with Standard ASTM D 1349-99, is recorded. Scanning is effected at an amplitude of deformation of 0.1 to 50% (outward cycle), then of 50% to 1% (return cycle). The results used are the complex dynamic shear modulus ($G^*$) and the loss factor (tan $\delta$). For the return cycle, the maximum value of tan $\delta$ which is observed is indicated ($\tan(\delta)_{max}$), as is the deviation in the complex modulus ($\Delta G^*$) between the values at 0.15 and 50% deformation (Payne effect).

d) "Bound Rubber" Test:

The so-called "bound rubber" test makes it possible to determine the proportion of elastomer, in a non-vulcanized composition, which is associated so intimately with the reinforcing filler that this proportion of elastomer is insoluble in the usual organic solvents. Knowledge of this insoluble proportion of rubber, linked with the reinforcing filler during mixing, gives a quantitative indication of the reinforcing activity of the filler in the rubber composition. Such a method has been described, for example, in French Standard NF T 45-114 (June 1989) applied to the determination of the amount of elastomer bound to the carbon black.

This test, which is well-known to the person skilled in the art for characterising the quality of reinforcement provided by the reinforcing filler, has been described, for example, in the following documents: *Plastics, Rubber and Composites Processing and Applications*, Vol. 25, No. 7, p. 327 (1996); *Rubber Chemistry and Technology*, Vol. 69, p. 325 (1996).

In the present case, the amount of elastomer which cannot be extracted with toluene is measured, after swelling for 15 days of a sample of rubber composition (typically 300–350 mg) in this solvent (for example in 80–100 $cm^3$ of toluene), followed by a 24-hour drying step at 100° C., in a vacuum, before weighing the sample of rubber composition thus treated. Preferably, the above swelling stage is carried out at ambient temperature (approximately 20° C.) and protected from light, and the solvent (toluene) is changed once, for example after the first five days' swelling. The amount of "bound rubber" (% by weight) is calculated in known manner by the difference between the initial weight and the final weight of the sample of rubber composition, after making allowance for and eliminating, in the calculation, the fraction of the components which are insoluble by nature, other than the elastomer, which are initially present in the rubber composition.

e) Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983): the minimum and maximum torques, measured in deciNewton.meters (dN.m), are referred to respectively as $C_{min}$ and $C_{max}$; $t_i$ is the induction period, that is to say, the time necessary for the start of the vulcanization reaction; $t_\alpha$ (for example $t_{99}$) is the time necessary to achieve a conversion of $\alpha$%, that is to say $\alpha$% (for example 99%) of the deviation between the minimum and maximum torques. The deviation, $\Delta$Torque (in dN.m), between the minimum and maximum torques and the conversion rate constant K (in $min^{-1}$) of order 1, calculated between 30% and 80% conversion, is also measured, which makes it possible to assess the vulcanization kinetics.

II. Conditions of Carrying Out the Invention

The rubber compositions according to the invention are based on the following constituents: (i) (at least) a diene elastomer, (ii) (at least) a reinforcing inorganic filler and (iii) (at least) a coupling agent providing the bond between this filler and this diene elastomer, said inorganic filler comprising a reinforcing silicon carbide as described in detail hereafter.

Of course, the expression composition "based on" is to be understood to mean a composition comprising the mix and/or the product of reaction in situ of the different base constituents used, some of these base constituents being able to and/or being intended to react together, at least in part, during the different phases of manufacture of the composition, or during the later curing thereof.

II-1. Diene Elastomer

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood in particular to be meant by diene elastomer capable of being used in the compositions according to the invention:

(a)—any homopolymer obtained by polymerisation of a conjugated diene monomer having 4 to 12 carbon atoms;

(b)—any copolymer obtained by copolymerisation of one or more dienes conjugated together or with one or more vinyl-aromatic compounds having 8 to 20 carbon atoms;

(c)—any ternary copolymer obtained by copolymerisation of ethylene, of an $\alpha$-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d)—any copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene an aryl-1,3-butadiene, 1,3-pentadiene and 2,4-hexadiene.

Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomising agent and the quantities of modifying and/or randomising agent used. The elastomers may for example be block, statistical, sequential or microsequential elastomers, and may be prepared in a dispersion or in solution; they may be coupled and/or starred or alternatively functionalised with a coupling and/or starring or functionalising agent.

Preferred are polybutadienes, and in particular those having a content of 1,2-units between 4% and 80%, or those having a content of cis-1,4 of more than 80%, polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight and a glass transition temperature ("Tg"—measured in accordance with ASTM Standard D3418-82) of between $-40°$ C. and $-80°$ C., isoprene-styrene copolymers and in particular those having a styrene content of between 5% and 50% by weight and a Tg of between $-25°$ C. and $-50°$ C.

In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene-styrene-isoprene copolymer having a Tg of between $-20°$ C. and $-70°$ C.

According to a preferred embodiment of the invention, the diene elastomer of the composition according to the invention is selected from the group of highly unsaturated diene elastomers which consists of polybutadienes (BR), synthetic polyisoprenes (IR), natural rubber (NR), butadiene-styrene copolymers (SBR), butadiene-isoprene copolymers (BIR), butadiene-acrylonitrile copolymers (NBR), isoprene-styrene copolymers (SIR), butadiene-styrene-isoprene copolymers (SBIR), and mixtures of these elastomers.

The composition according to the invention is in particular intended for a tread for a tire, be it a new or a used tire (case of recapping).

When such a tread is intended for example for a passenger-car tire, the diene elastomer is preferably an SBR or an SBR/BR, SBR/NR (or SBR/IR), or alternatively BR/NR (or BR/IR) blend (mixture). In the case of an SBR elastomer, in particular an SBR having a styrene content of between 20% and 30% by weight, a content of vinyl bonds of the butadiene part of between 15% and 65%, a content of trans-1,4 bonds of between 15% and 75%, and a Tg of between $-20°$ C. and $-55°$ C. is used, this SBR copolymer, which is preferably prepared in solution (SSBR), possibly being used in a mixture with a polybutadiene (BR) having preferably more than 90% cis-1,4 bonds.

When the tread is intended for a utility tire such as a heavy-vehicle tire, the diene elastomer is preferably an isoprene elastomer. "Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene-isoprene copolymers (butyl rubber—IIR), isoprene-styrene copolymers (SIR), isoprene-butadiene copolymers (BIR) or isoprene-butadiene-styrene copolymers (SBIR). The isoprene elastomer is preferably natural rubber or a synthetic polyisoprene of the cis-1,4 type. Of these synthetic polyisoprenes, preferably polyisoprenes having a content (mole %) of cis-1,4 bonds greater than 90%, more preferably still greater than 98%, are used. Of course, the diene elastomer may also be formed, in part, by another highly unsaturated elastomer such as, for example, an SBR elastomer.

According to another advantageous embodiment of the invention, in particular when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

II-2. Reinforcing Filler

The silicon carbide used as reinforcing inorganic filler may constitute all or only part of the total reinforcing filler, in the latter case associated, for example, with another reinforcing inorganic filler such as silica, or with conventional carbon black.

Preferably, it constitutes the majority, that is to say, more than 50%, of the total reinforcing filler (i.e. of the total inorganic reinforcing filler in the absence of carbon black), this percentage being expressed here by volume and not by weight, to make allowance for the great difference in density between a silicon carbide and a conventional filler of the type carbon black or silica. Advantageously, the reinforcing silicon carbide may constitute the entire reinforcing (inorganic) filler.

In the present application, "reinforcing" filler is generally understood to mean a filler which is capable, on its own, without any other means than an intermediate coupling agent, of reinforcing a rubber composition intended for the manufacture of tires; in other words, an inorganic filler referred to as a "reinforcing" filler is capable of replacing a conventional tire-grade carbon black filler in its reinforcement function.

The composition according to the invention therefore uses, as reinforcing filler, a silicon carbide having the following characteristics: (a) a BET specific surface area of between 20 and 200 m$^2$/g; (b) an average particle size (by mass), $d_w$, of between 10 and 350 nm.

"Silicon carbide" is understood to mean any compound corresponding, apart from any impurities, to the known formula SiC, whatever its form, whether crystalline or amorphous.

For a BET surface area of less than 20 m$^2$/g, although the compositions have easier working and a reduced hysteresis, a decline in the breaking properties and wear resistance in the tire which diminishes are observed; for BET surface areas greater than 200 m$^2$/g, working in the uncured state becomes more difficult (higher Mooney plasticity) and the dispersion of the filler is adversely affected as a result. For excessively large sizes $d_w$, greater than 350 nm, the particles act like defects which localise stresses and are harmful in terms of wear; sizes $d_w$ which are too small, less than 10 nm, on the other hand, will impair working in the uncured state and the dispersion of the filler during this working.

For all the reasons set forth above, the BET surface area preferably lies between 20 and 150 m$^2$/g and the particle size $d_w$ preferably lies within a range from 20 to 300 nm.

The intrinsic dispersibility of a filler can be evaluated using the known ultrasound disagglomeration test described in Section I above, by measuring the disagglomeration rate α of this filler. Preferably, the reinforcing silicon carbide previously described has a rate α which is greater than $1 \times 10^{-4}$ µm$^{-1}$/s, measured in the disagglomeration test at 20% power of a 600 W ultrasound probe. Such a preferred characteristic guarantees for this type of product a very good ability firstly to be incorporated into the matrix during mixing with the elastomer and secondly to disagglomerate in order to disperse, in finely divided form, homogenously in the rubber matrix, For such a rate α greater than $1 \times 10^{-4}$ µm$^{-1}$/s, it was noted that few micronic agglomerates are observed by optical microscopy reflection on a section of rubber composition prepared in accordance with the rules of the art.

More preferably, in particular when the compositions of the invention are intended for treads for tires having low rolling resistance and high wear resistance, the reinforcing silicon carbides used satisfy at least one of the following characteristics, preferably both:

a BET surface area within a range from 25 to 140 m$^2$/g;

a particle size $d_w$ within a range from 20 to 250 nm.

Furthermore, for even better dispersibility of the reinforcing silicon carbide in the diene rubber matrix, and therefore for optimum reinforcement, it is preferred that its disagglomeration rate α be greater than $5 \times 10^{-4}$ µm$^{-1}$/s, more preferably still, greater than $1 \times 10^{-3}$ µm$^{-1}$/s.

The particles of reinforcing silicon carbide furthermore have good surface reactivity, that is to say a high number of surface hydroxyl functions (—OH) which are reactive with respect to the coupling agent, which is particularly favourable to the reinforcement function performed by the filler, and therefore to the mechanical properties of the rubber compositions of the invention.

The physical state in which the reinforcing silicon carbide may be present is immaterial, whether it be in the form of a powder, microbeads, granules, balls, or any other densified form, provided, of course, that the mode of densification does not adversely affect the essential or preferred characteristics advocated for this filler.

The reinforcing silicon carbide described above may be used on its own or associated with another reinforcing inorganic filler, or even several, for example a silica or an alumina. It will be recalled here that, in contrast to conventional carbon black, "white" filler (sometimes also referred to as "clear" filler) is to be understood to mean any inorganic or mineral filler, whatever its colour and its origin (natural or synthetic).

In the case of a silica, preferably a highly dispersible precipitated silica is used, in particular when the invention is used for the manufacture of treads for tires having low rolling resistance; as non-limitative examples of such preferred highly dispersible silicas, mention may be made of the silicas Ultrasil 7000 and Ultrasil 7005 from Degussa, the silicas Zeosil 1165MP, 1135MP and 1115MP from Rhodia, the silica Hi-Sil EZ150G from PPG, the silicas Zeopol 8715, 8745 and 8775 from Huber, and treated precipitated silicas such as, for example, the aluminium-"doped" silicas described in the aforementioned application EP-A-0735088. If a reinforcing alumina is used, this is preferably a highly dispersible alumina such as described in application EP-A-0810258 referred to above, for example the aluminas "Baikalox" "A125" or "CR125" (from Baikowski), "APA-100RDX" (from Condea), "Aluminoxid C" (from Degussa) or "AKP-G015" (Sumitomo Chemicals).

The reinforcing silicon carbide, on its own or possibly associated with another reinforcing inorganic filler, may also be used in a blend, i.e. in a mixture, with one or more conventional tire-grade carbon blacks. Suitable carbon blacks are any carbon blacks, in particular the blacks of type HAF, ISAF and SAF, which are conventionally used in tires, and particularly in tire treads. As non-limitative examples of such blacks, mention may be made of the blacks N115, N134, N234, N330, N339, N347, N375.

The quantity of carbon black present in the total reinforcing filler may vary within wide limits, this quantity however preferably being less than the quantity of silicon carbide present in the rubber composition.

In the compositions according to the invention, a carbon black is used advantageously, in association with the reinforcing silicon carbide, in a small proportion, in a preferred amount of between 2 and 20 phr, more preferably within a range of 5 to 15 phr (parts by weight per hundred parts of elastomer). Within the ranges indicated, there is a benefit to be had from the colouring properties (black pigmentation agent) and anti-UV properties of the carbon blacks, without furthermore adversely affecting the typical performance provided by the reinforcing silicon carbide.

Preferably, the amount of total reinforcing filler in the compositions of the invention lies within a range from 20 to 400 phr, more preferably from 30 to 200 phr, as far as the amount of inorganic filler is also concerned. The optimum in fact differs according to the intended applications: in known manner, the level of reinforcement expected for a bicycle tire, for example, is distinctly lower than that required for a tire for a passenger vehicle or for a utility vehicle such as a heavy vehicle. When the compositions of the invention are intended for treads for tires, the amount of reinforcing inorganic filler, and therefore of reinforcing silicon carbide when the latter constitutes the entire reinforcing inorganic filler, is selected to be preferably greater than 50 phr, for example between 50 and 150 phr, more preferably still greater than 60 phr.

By way of examples of reinforcing silicon carbides liable to be suitable for the rubber compositions of the invention, mention will be made in particular of silicon carbides obtained in known manner by a laser pyrolysis technique (see for example FR-A-2677558); their synthesis has been described in detail, in particular in the following publications: "*Laser synthesis of silicon carbide powders from silane and hydrocarbon mixtures*", M. Cauchetier, O. Croix and M. Luce, *Adv. Ceram. Mater.*, 3(6), 548–552 (1988); or "*Evolution of the structure of ultrafine silicon carbide laser-formed powders with synthesis conditions*", P. Tougne, H. Hommel, A. Legrand, N. Herlin, M. Luce and M. Cauchetier, *Diam. Relat. Mater.*, 2(2–4), 486–490 (1993).

Another example of reinforcing silicon carbide usable in the compositions according to the invention is the silicon carbide sold by MarkeTech International Inc. (USA, Port Townsend-Wash.) under the reference "NP-S0140".

II-3. Coupling Agent

It is well-known to the person skilled in the art that it is necessary to use, for a reinforcing inorganic filler such as, for example, a silica or a reinforcing alumina, a (white filler/elastomer) coupling agent, also referred to as a bonding agent, the role of which is to produce the bond or "coupling" between the white filler and the elastomer, while facilitating the dispersion of this inorganic filler within the elastomeric matrix.

The reinforcing silicon carbide described previously also requires the use of such a coupling agent in order to perform its function of reinforcing filler in the rubber compositions according to the invention.

"Coupling agent" is more precisely understood to mean an agent capable of establishing a sufficient chemical and/or physical connection between the filler in question and the elastomer; such a coupling agent, which is at least bifunctional, has, for example, the simplified general formula "Y—T—X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulfur atom;

T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any known coupling agent known to or likely to ensure, in the diene rubber compositions usable for the manufacture of tires, the effective bonding or coupling between a reinforcing white filler such as silica and a diene elastomer, such as, for example, organosilanes, in particular polysulfurized alkoxysilanes or mercaptosilanes, or alternatively polyorganosiloxanes bearing the X and Y functions mentioned above, may be used.

Silica/elastomer coupling agents in particular have been described in a large number of documents, the best known being bifunctional alkoxysilanes such as polysulfurized alkoxysilanes.

In particular polysulfurized alkoxysilanes, which are referred to as "symmetrical" or "asymmetrical" depending on their specific structure, are used, such as those described for example in patents U.S. Pat. Nos. 3,842,111, 3,873,489, 3,978,103, 3,997,581, 4,002,594, 4,072,701, 4,129,585, or in the more recent patents U.S. Pat. Nos. 5,580,919, 5,583, 245, 5,650,457, 5,663,358, 5,663,395, 5,663,396, 5,674,932, 5,675,014, 5,684,171, 5,684,172, 5,696,197, 5,708,053, 5,892,085, EP-A-1 043 357, which describe such known compounds in detail.

Particularly suitable for implementing the invention, without the definition below being limitative, are symmetrical polysulfurized alkoxysilanes which satisfy the following general formula (I):

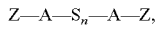  (I) in which:

n is an integer from 2 to 8 (preferably from 2 to 5);

A is a divalent hydrocarbon radical (preferably $C_1$–$C_{18}$ alkylene groups or $C_6$–$C_{12}$ arylene groups, more particularly $C_1$–$C_{10}$ alkylenes, in particular $C_1$–$C_4$ alkylenes, in particular propylene);

Z corresponds to one of the formulae below:

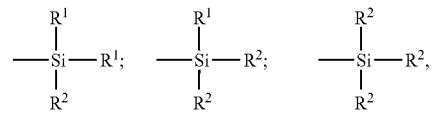

in which:

radicals $R^1$, which may or may not be substituted, and may be identical or different, represent a $C_1$–$C_{18}$ alkyl group, a $C_5$–$C_{18}$ cycloalkyl group or a $C_6$–$C_{18}$ aryl group, (preferably $C_1$–$C_6$ alkyl groups, cyclohexyl or phenyl, in particular $C_1$–$C_4$ alkyl groups, more particularly methyl and/or ethyl).

the radicals $R^2$, which may or may not be substituted, and may be identical or different, represent a $C_1$–$C_{18}$ alkoxyl group or a $C_5$–$C_{18}$ cycloalkoxyl group (preferably $C_1$–$C_8$ alkoxyl groups or $C_5$–$C_8$ cycloalkoxyl groups, more preferably $C_1$–$C_4$ alkoxyl groups, in particular methoxyl and/or ethoxyl).

In the case of a mixture of polysulfurized alkoxysilanes in accordance with Formula (I) above, in particular conventional, commercially available, mixes, the average value of the "n"s is a fractional number, preferably between 2 and 5, more preferably close to 4. However, the invention may also be implemented advantageously for example with disulfurized alkoxysilanes (n=2).

As polysulfurized alkoxysilanes, mention will be made more particularly of the polysulfides (in particular disulfides, trisulfides or tetrasulfides) of bis-(($C_1$–$C_4$)alkoxyl-($C_1$–$C_4$) alkylsilyl($C_1$–$C_4$)alkyl), such as for example the polysulfides of bis(3-trimethoxysilylpropyl) or of bis(3-triethoxysilylpropyl). Of these compounds, preferably bis(3-triethoxysilylpropyl) tetrasulfide, abbreviated TESPT, of the formula $[(C_2H_5O)_3Si(CH_2)_3S_2]_2$, or bis(triethoxysilylpropyl) disulfide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulfide (75% by weight) and of polysulfides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulfides having an average value of n which is close to 4).

By way of examples of coupling agents other than the aforementioned polysulfurized alkoxysilanes, mention will be made in particular of the bifunctional polyorganosiloxanes such as described for example in the aforementioned application WO99/02602.

The person skilled in the art will be able to adjust the content of coupling agent in the compositions of the invention, according to the intended application, the nature of the elastomer used, and the quantity of reinforcing silicon carbide, supplemented if applicable by any other inorganic filler used as complementary reinforcing filler.

So as to make allowance for the differences in specific surface area and density of the silicon carbides (and, if applicable, any other associated reinforcing inorganic fillers) which may be used, as well as the molar masses of the coupling agents, it is preferable to determine the optimum amount of coupling agent, in moles per meter squared of reinforcing inorganic filler, for each reinforcing inorganic filler (silicon carbide plus, if applicable, associated additional inorganic filler) used; this optimum amount is calculated from the weight ratio [coupling agent/reinforcing inorganic filler], the BET surface area of the filler and the molar mass of the coupling agent (referred to as M hereafter), according to the following known equation:

(moles/$m^2$ inorganic filler)=[coupling agent/inorganic filler] (1/BET) (1/M)

Preferably, the quantity of coupling agent used in the compositions according to the invention lies between $10^{-7}$ and $10^{-5}$ moles per $m^2$ of reinforcing inorganic filler, i.e. per $m^2$ of reinforcing silicon carbide when the latter is used without an associated reinforcing inorganic filler. More preferably still, the quantity of coupling agent lies between $5 \times 10^{-7}$ and $5 \times 10^{-6}$ moles per meter squared of total inorganic filler (silicon carbide plus if applicable associated additional inorganic filler).

Taking into account the quantities expressed above, generally, the amount of coupling agent, reduced to the weight of diene elastomer, will preferably be between 0.1 and 25 phr, more preferably between 0.5 and 20 phr.

The coupling agent used could be grafted beforehand (via the "X" function) on to the diene elastomer of the composition of the invention, the elastomer thus functionalised or "precoupled" then comprising the free "Y" function for the reinforcing silicon carbide. The coupling agent could also be grafted beforehand (via the "Y" function) on to the reinforcing silicon carbide, the filler thus "precoupled" then being able to be bonded to the diene elastomer by means of the free "X" functions. However, it is preferred to use the coupling agent in the free (i.e. non-grafted) state or grafted on to the reinforcing silicon carbide, in particular for reasons of better processing of the compositions in the uncured state.

Finally, there may possibly be associated with the coupling agent an appropriate "coupling activator", that is to say, a body (i.e. a single compound or association of compounds) which, when mixed with this coupling agent, increases the effectiveness of the latter. Coupling activators for polysulfurized alkoxysilanes have for example been described in applications WO00/5300 and WO00/5301, consisting of the association of a substituted guanidine, in particular N,N'-diphenylguanidine (abbreviated to "DPG"), with an enamine or a zinc dithiophosphate. The presence of these coupling activators will make it possible, for example, to reduce the amount of reinforcing inorganic filler owing to the improved coupling with the elastomer.

II-4. Various Additives

Of course, the compositions according to the invention contain, in addition to the compounds already described, all or part of the constituents usually used in diene rubber compositions intended for the manufacture of tires, such as plasticisers, pigments, protective agents of the type antioxidants, antiozonants, a cross-linking system based either on sulfur or on sulfur and/or peroxide and/or bismaleimide donors, vulcanization accelerators, vulcanization activators, extender oils, etc. There may also be associated with the reinforcing white filler of the invention, if necessary, a conventional non-reinforcing white filler, such as clays, bentonite, talc, chalk or kaolin.

The rubber compositions according to the invention may also contain, in addition to the aforementioned coupling agents, agents (comprising for example the single Y function) for covering the reinforcing inorganic filler, or more generally processing aids liable, in known manner, owing to an improvement in the dispersion of the reinforcing inorganic filler in the rubber matrix and to a reduction in the viscosity of the compositions, to improve their ability to be worked in the uncured state, these agents, used, for example, in a preferred amount of between 0.5 and 3 phr, being, for example, alkylalkoxysilanes, (in particular alkyltriethoxysilanes, such as for example 1-octyl-triethoxysilane sold by Degussa-Hüls under the name Dynasylan Octeo, or 1-hexadecyl-triethoxysilane sold by Degussa-Hüls under the name Si216), polyols, polyethers (for example polyethylene glycols), primary, secondary or tertiary amines (for example trialkanolamines), hydroxylated or hydrolysable polyorganosiloxanes, for example α,ω-dihydroxypolyorganosiloxanes (in particular α,ω-dihydroxy-polydimethylsiloxanes).

II-5. Preparation of the Rubber Compositions

The compositions are produced in suitable mixers, using two successive preparation phases well-known to the person skilled in the art: a first phase of thermomechanical working or kneading (sometimes referred to as "non-productive"

phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 60° C. and 100° C., during which finishing phase the cross-linking or vulcanization system is incorporated; such phases have been described for example in the aforementioned applications EP-A-0 501 227, EP-A-0 735 088, EP-A-0 810 258, WO00/05300 or WO00/05301.

The manufacturing process according to the invention is characterized in that at least the reinforcing filler and the coupling agent are incorporated by kneading in the diene elastomer during the first, so-called non-productive, phase, that is to say that at least these different base constituents are introduced into the mixer and kneaded thermomechanically, in one or more stages, until a maximum temperature of between 110° C. and 190° C., preferably of between 130° C. and 180° C., is reached.

By way of example, the first (non-productive) phase is effected in a single thermomechanical step during which all the base constituents necessary, any additional covering agents or processing agents and various other additives, with the exception of the vulcanization system, are introduced into a suitable mixer, such as a conventional internal mixer. A second stage of thermomechanical working may be added, in this internal mixer, after the mixture has dropped and after intermediate cooling (cooling temperature preferably less than 100° C.), with the aim of making the compositions undergo complementary heat treatment, in particular in order to improve further the dispersion, in the elastomeric matrix, of the reinforcing filler and its coupling agent. The total duration of the kneading, in this non-productive phase, is preferably between 2 and 10 minutes.

After cooling of the mixture thus obtained, the vulcanization system is then incorporated at low temperature, generally in an external mixer such as an open mill; the entire composition is then mixed (productive phase) for several minutes, for example between 5 and 15 minutes.

The final composition thus obtained is then calendered, for example in the form of a film or a sheet, in particular for characterisation in the laboratory, or alternatively extruded, in order to form for example a rubber profiled element used for manufacturing semi-finished products such as treads, crown plies, sidewalls, carcass plies, beads, protectors, inner tubes or airtight internal rubbers for tubeless tires.

The vulcanization (or curing) is carried out in known manner at a temperature generally between 130° C. and 200° C., under pressure, for a sufficient time which may vary, for example, between 5 and 90 minutes, depending, in particular, on the curing temperature, the vulcanization system adopted, the vulcanization kinetics of the composition in question or alternatively the size of the tire.

The vulcanization system proper is preferably based on sulfur and a primary vulcanization accelerator, in particular an accelerator of the sulfenamide type. To this basic vulcanization system there are added, incorporated during the first non-productive phase and/or during the productive phase, various known secondary accelerators or vulcanization activators such as zinc oxide, stearic acid, guanidine derivatives (in particular diphenylguanidine), etc. The sulfur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

It goes without saying that the invention relates to the rubber compositions previously described, both in the "uncured" state (i.e. before curing) and in the "cured" or vulcanized state (i.e. after cross-linking or vulcanization).

Of course, the compositions according to the invention may be used alone or in a blend (i.e. in a mixture) with any other rubber composition which can be used for manufacturing tires.

III. Examples of Embodiment of the Invention

III-1. Fillers Used

The characteristics of the fillers used in the following examples are set forth in Table 1.

Filler A is a tire-grade carbon black (N234), used conventionally in treads for tires. Filler B is a conventional (i.e. non-reinforcing) silicon carbide conventionally used as an abrasive powder (SiC20000 from Sika Norton AS). Filler D is a coarse silicon carbide, sold by GoodFellow under the reference SI 51 6010 (particle size: 75 μm, according to catalogue data). Finally, fillers C, E and F are reinforcing silicon carbides, that is to say, ones usable in the compositions according to the invention (characteristics a and b met).

Filler F is available commercially (from MarkeTech International Inc.—reference "NP-S0140").

As for fillers C and E, they were prepared in known manner by laser pyrolysis of gaseous precursors, in accordance with the aforementioned publication *Adv. Ceram. Mater.*, 3(6), 548–552 (1988), using the following stages:

a gaseous mixture (silane plus acetylene) is introduced vertically, by means of a capillary of an internal diameter of 2 mm, into the laser irradiation enclosure equipped with a KCl window which is transparent to the laser beam;

in this enclosure, the laser beam (continuous $CO_2$ laser making it possible to achieve 1 kW of power), of Gaussian distribution, with a diameter of 12 mm and a maximum power density of 700 W/cm², intercepts the gas stream horizontally and brings about the synthesis reaction of the silicon carbide from the gaseous mixture, by resonance between the laser emission and one of the infrared absorption bands of the reagent (silane) of wavelength equal to that of the laser radiation;

a flow of argon (approximately 2 L/min) prevents deposition of the silicon carbide powder on the KCl window and entrains the product formed into the powder collector.

The silane used is $SiH_4$, with a flow rate of the order of 350 cm³/min. The acetylene is used in a flow rate of approximately 190 cm³/min. In these conditions, the dwell time in the reaction zone (that is to say, in the laser beam) is approximately 4 ms for a speed of travel of 2.9 m/s.

It will be noted that fillers C, E and F have a particle size $d_w$ of between 30 and 100 nm, very much less than that of fillers B or D, and of the same order of magnitude as that of filler A. Their BET surface area lies between 60 and 120 m²/g. Their disagglomeration rate α is advantageously very high (all greater than $5 \times 10^{-4}$ μm⁻¹/s, greater than $1 \times 10^{-3}$ μm⁻¹/s for fillers C and E), more than one hundred times greater than that of filler D. As the ability of carbon blacks to disagglomerate is known to be excellent, very distinctly greater than that of the other fillers, it is not necessary to measure the rate α for filler A.

Rates α as high as those measured on these reinforcing silicon carbides, in particular on the fillers C and E, are unexpected for an inorganic filler: the ultrasound disagglomeration test applied under the same conditions to a known HD silica ("Zeosil 1165 MP") resulted in a rate α approximately one hundred times lower.

FIGS. 1, 2, 3 and 4 reproduce the curves of evolution $[1/d_V(t)=f(t)]$ of the size of the agglomerates, recorded in the ultrasound disagglomeration test, respectively for fillers B, C, E and F. It can clearly be seen from these figures that the first points recorded ("t" varying from 0 to about 30 s) correspond to the measurement of the initial average diameter $d_V[0]$, followed (after actuation of the ultrasonic probe) by progressive passage (here, "t" from 30 s to about 3 min) to stable disagglomeration conditions during which the reciprocal of "$d_V$" varies substantially linearly with the time "t"; the recording of the data is stopped here after about 8 to 9 minutes. The disagglomeration rate α is deduced from this by elementary calculation of linear regression, performed by the calculator of the granulometer within the zone of stable disagglomeration conditions (between 3–4 min and 8–9 min approximately).

III-2. Preparation of the Compositions

The compositions tested hereafter are prepared in known manner, as follows: the diene elastomer (or the mixture of diene elastomers, if applicable) is introduced into an internal mixer filled to 75%, the initial tank temperature of which is approximately 90° C.; then, after an appropriate kneading time, for example of the order of 1 minute, all the other ingredients are added, including the filler and the associated coupling agent, with the exception of the vulcanization system. Thermomechanical working of a duration of about 10 minutes is then performed, with an average blade speed of 70 rpm, until a dropping temperature of about 160° C. is obtained.

The mixture thus obtained is recovered, it is cooled and then the vulcanization system (sulfur and sulfenamide-type primary accelerator) are added on an external mixer (homo-finisher) at 30° C., by mixing everything (productive phase) for a suitable time, of between 5 and 12 minutes depending on the case.

The compositions thus obtained are then calendered either in the form of plates (thickness of 2 to 3 mm) of rubber in order to measure their mechanical properties, or extruded in the form of treads for passenger-car tires. Vulcanization (curing) is carried out at 150° C. for 40 min, under pressure.

In all the following tests, the reinforcing silicon carbide is present, in the compositions according to the invention, in a preferred amount greater than 70 phr; it furthermore constitutes all or more than 90% by weight of all the reinforcing filler, a minority fraction (less than 10%) of the latter possibly being formed by carbon black.

III-3. Tests

A) Test 1

The aim of this test is to show that a conventional silicon carbide, even in the presence of a high-performance coupling agent, cannot claim to be a reinforcing inorganic filler.

For this, three diene rubber compositions typically used for the manufacture of treads for tires are compared, these compositions all being not in accordance with the invention. The diene elastomer is an SBR prepared in solution (SSBR), comprising 25% by mass of styrene, the polybutadiene units present being 58% 1,2-polybutadiene units and 23% trans-1,4 polybutadiene units.

These three compositions are identical except for the following differences:

composition C-1: filler A (carbon black);
composition C-2: filler B (SiC), without coupling agent;
composition C-3: filler B (SiC), with coupling agent.

The carbon black selected for the control composition C-1 is a tire-grade black of very great reinforcing ability, used conventionally for reinforcing treads for passenger-vehicle tires.

In compositions C-2 and C-3, the silicon carbide is used in iso-volume relative to the carbon black (composition C-1). As for the TESPT coupling agent (Si69), it was introduced in an amount corresponding to total surface coverage of the 78 phr of silicon carbide, or approximately $9.3 \times 10^{-7}$ mole/m$^2$ of silicon carbide. The composition C-1 which serves here as a reference does not, in known manner, require a coupling agent since it is reinforced with carbon black.

Figure 5:
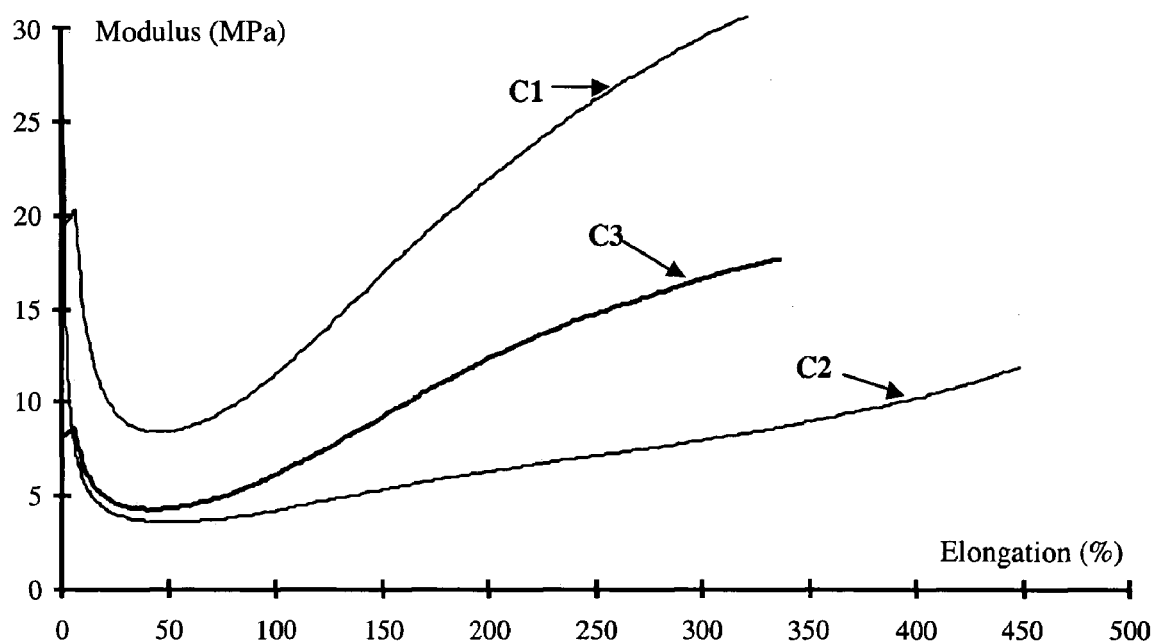
FIGS. 5–8 show curves of the variation of modulus as a function of elongation for different diene rubber compositions, whether or not in accordance with the invention.

Tables 2 and 3 show in succession the formulation of the different compositions (Table 2—amount of the different products expressed in phr), and their properties before and after curing at 150° C. for 40 minutes (Table 3). FIG. 5 shows the curves of true secant modulus "M" (in MPa) as a function of the elongation (in %); these curves are marked C1 to C3, and correspond to rubber compositions C-1 to C-3 respectively.

A study of the different results shows that compositions C-2 and C-3 based on silicon carbide have after curing a level of reinforcement which is very distinctly less than that of the control composition C-1 based on carbon black: breaking stress approximately two to three times lower, moduli at the high deformations (M100 and M300) distinctly lower, measurement of "bound rubber" impossible owing to crumbled compositions, all clear indicators to the person skilled in the art of a poor level of reinforcement for the two compositions based on conventional silicon (filler B).

The attached FIG. 5 confirms the above results: it will be noted that the curves C2 and C3 are located very much on this side of the control curve C1, the distance being all the more marked as the elongation increases; this clearly illustrates a very poor quality of reinforcement between the (non-reinforcing) silicon carbide and the elastomer. Admittedly, a greater level of reinforcement is achieved in the presence of a coupling agent such as TESPT (curve C3 compared with curve C2), but it remains very distinctly less than what is expected of a true reinforcing filler such as carbon black (curve C1).

B) Test 2

The aim of this second test is to show that a reinforcing silicon carbide such as described above can to the contrary claim to be a reinforcing inorganic filler.

For this, two diene rubber compositions usable for the manufacture of tires, in particular of treads for passenger-car tires, are compared. The diene elastomer is an SSBR comprising 27% by mass of styrene, the polybutadiene units being 25% 1,2-polybutadiene units and 48% trans-1,4 polybutadiene units.

These two compositions are identical except for the following differences:

composition C-4 (control): filler A (carbon black);
composition C-5 (according to the invention): filler C, with coupling agent (TESPT).

In composition C-5, the coupling agent was introduced at a rate of surface coverage substantially equivalent to that selected for the preceding composition C-3 (namely approximately $9.3 \times 10^{-7}$ mole/m$^2$ of silicon carbide); of course, the quantity of coupling agent used is greater to make allowance for the larger BET surface area of the reinforcing silicon carbide tested here. As for the control composition C-4, it is conventionally filled with carbon black.

Figure 6:
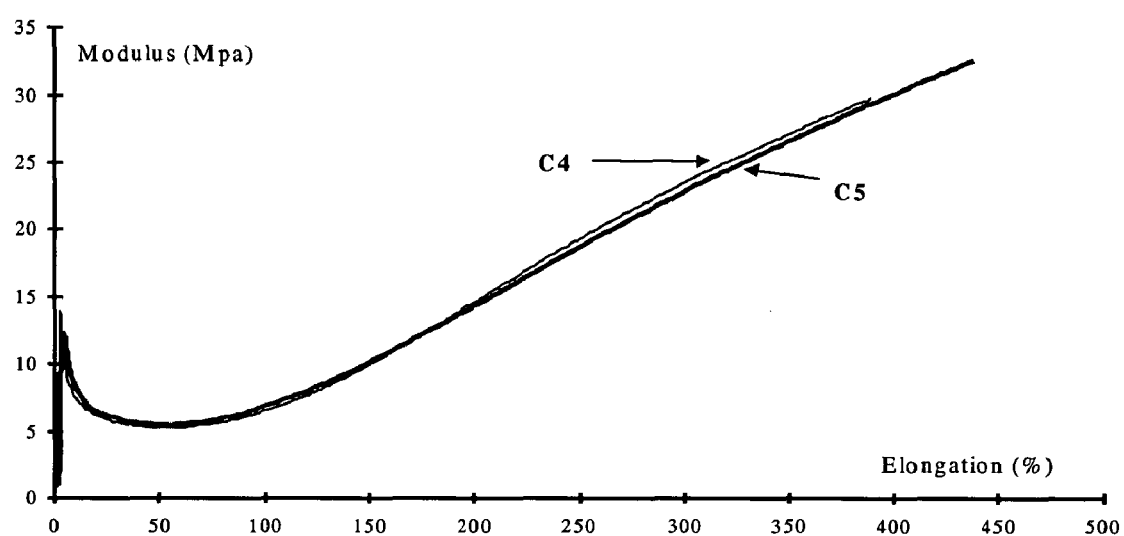

Tables 4 and 5 show in succession the formulation of the different compositions (Table 4—amount of the different products expressed in phr), and their properties before and after curing at 150° C. for 40 minutes (Table 5). FIG. 6 shows the curves of modulus "M" (in MPa) as a function of the elongation (in %); these curves are marked C4 and C5, and correspond to compositions C-4 and C-5 respectively.

A study of the different results shows that the composition of the invention has after curing a level of reinforcement equivalent to that of the control composition, with equivalent moduli, in particular at high deformations (M100 and M300), a ratio M300/M100 which is similar, measurements identical to the "bound rubber" test, all indications of reinforcement well known to the person skilled in the art which demonstrate the remarkable reinforcing activity of filler C, in the presence of the coupling agent. The attached FIG. 6 confirms the preceding observations, with curves C4 and C5 which appear to virtually coincide.

C) Test 3

In this third test, another reinforcing silicon carbide (filler E) is compared on one hand with a conventional carbon black (filler A), and on the other hand with a non-reinforcing silicon carbide, of "coarse" type (filler D), as used conventionally in some treads of the aforementioned prior art (see in particular the aforementioned documents JP-A-1990/091137, U.S. Pat. No. 3,878,147).

For this, three rubber compositions similar to those of Test 2 above are compared, which are intended for the manufacture of treads for passenger-car tires; these three compositions are identical except for the following differences:
 composition C-6 (control): filler A (carbon black);
 composition C-7 (not in accordance with the invention): filler D, with coupling agent;
 3. composition C-8 (according to the invention): filler E, with coupling agent.

In compositions C-7 and C-8, the coupling agent was introduced at a rate of surface coverage equivalent to that selected for the preceding composition C-5 (namely approximately $9.3 \times 10^{-7}$ mole/m$^2$ of silicon carbide). The control composition C-6, filled with carbon black, is equivalent to that used in the preceding test (composition C-4).

Figure 7:
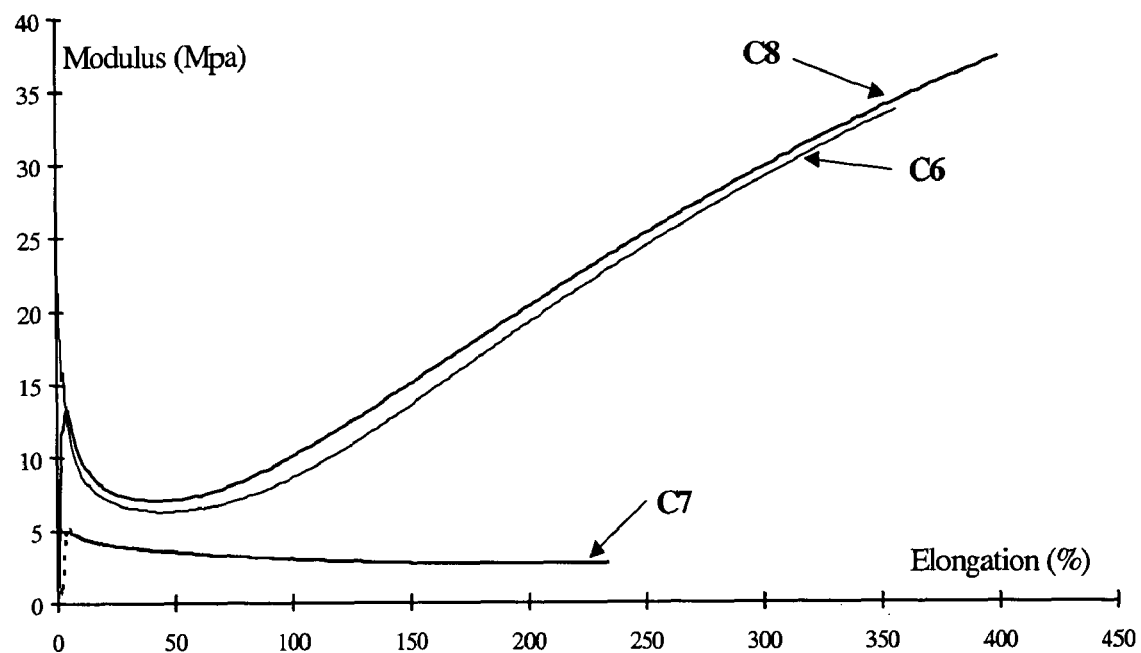

Tables 6 and 7 show in succession the formulation of the different compositions (Table 6—amount of the different products expressed in phr), and their properties before and after curing at 150° C. for 40 minutes (Table 7). FIG. 7 shows the curves of modulus (in MPa) as a function of the elongation (in %); these curves are marked C6 to C8, and correspond to compositions C-6 to C-8 respectively.

It will be noted first of all that the elasticity in the uncured state is as low for the composition C-8 of the invention (92 MU), reinforced with the reinforcing silicon carbide, as for the control composition (91 MU) reinforced with carbon black. This result indicates immediately to the person skilled in the art an unexpected processing ability for the composition according to the invention, greater than those available hitherto with the known reinforcing inorganic fillers. By way of example, a high-quality HD silica ("Zeosil 1165 MP"), for an equivalent formulation (i.e. at iso-volume of filler and the same rate of surface coverage by the coupling agent), results in an increase in plasticity of approximately 15% compared with the control solution based on carbon black.

As for the very low plasticity value observed on composition C-7, based on coarse silicon carbide, it is obviously due to a virtually non-existent level of reinforcement, as illustrated by FIG. 7 (curve C7) and by the properties after curing: very low mechanical properties at break, modulus E100 equivalent to E10, "bound rubber" measurement impossible owing to a crumbled composition, etc.

On the other hand, composition C-8 based on reinforcing silicon carbide has after curing a level of reinforcement at least equivalent to that of the control composition C-6: mechanical properties at break, moduli at high deformations (E100 and E300) and measurements of "bound rubber" slightly greater, ratio E300/E100 and dynamic properties ($\Delta G^*$ and $\tan(\delta)_{max}$) very similar. The attached FIG. 7 confirms the above observations, with a curve C8 slightly beyond the control curve C6.

Finally, equally unexpectedly, it will also be noted that the vulcanization kinetics, illustrated by the conversion rate constant K, are just as good for the composition of the invention as for the composition based on carbon black. This result supplied by the reinforcing silicon carbide constitutes a significant improvement compared with the known compositions based on reinforcing white fillers such as HD silicas which, for an equivalent formulation, suffer in known manner from a very significant reduction in the constant K (generally divided by a factor of 2 to 3), compared with a conventional composition filled with carbon black.

D) Test 4

This test confirms the excellent reinforcement performance, compared with a reference carbon black, of reinforcing silicon carbides, illustrated this time by means of a commercial silicon carbide (filler F).

Two compositions similar to those of Test 2 above are compared, except that the carbon black (filler A—control composition C-9) is compared here with the commercial filler F and that furthermore a guanidine derivative (DPG) is used as processing agent in the composition according to the invention (composition C-10).

Figure 8:
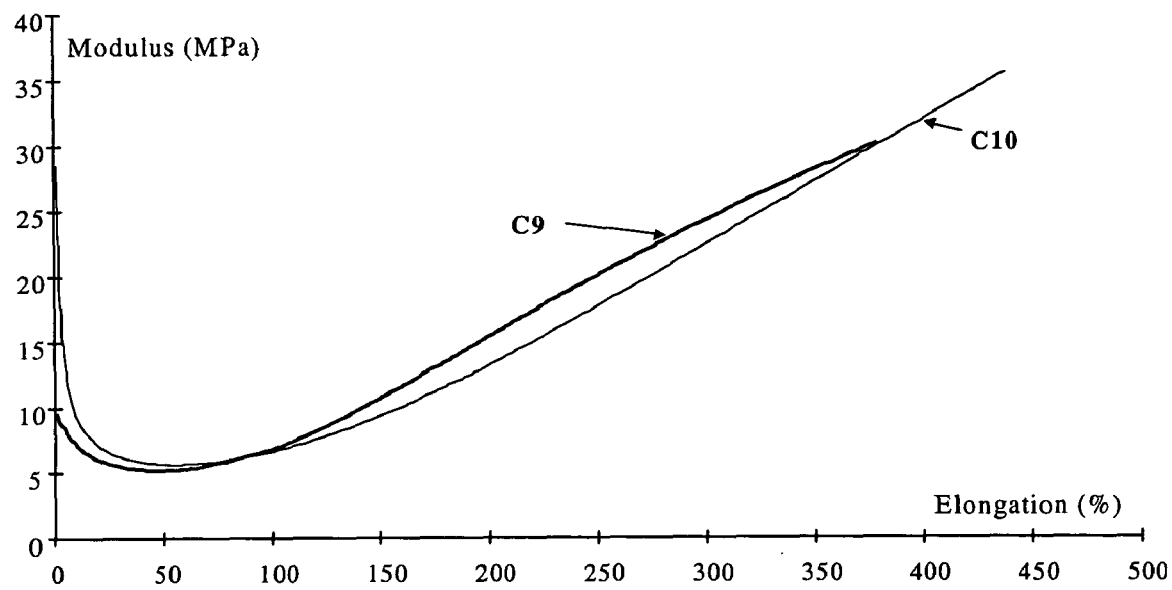

Tables 8 and 9 show the formulation of the two compositions, and their properties before and after curing at 150° C. for 40 min. In composition C-10, the quantity of coupling agent used is greater than that of the preceding tests in order to take into account the larger BET surface area of the silicon carbide tested here. FIG. 8 shows the curves of modulus (in MPa) as a function of the elongation (in %); these curves are marked C9 and C10, and correspond to compositions C-9 and C-10 respectively.

Although the performance of the filler F may appear slightly poorer than that of the filler E previously tested, probably due to a poorer ability to disagglomerate (rate α less high) of the former, the performances of the reinforcing silicon carbide remain entirely astonishing. It will be noted that the composition of the invention C-10 has after curing a reinforcement equivalent to that of the control composition C-9, with moduli at the high deformations (M100 and M300), a ratio M300/M100 and measurements of "bound rubber" which are similar, and mechanical properties at break which are slightly greater. The attached FIG. 8 confirms the above observations with curves C-9 and C-10 which virtually coincide, intersecting furthermore towards the greatest elongations to the advantage of the composition of the invention (curve C10).

In conclusion, the specific silicon carbides of the compositions according to the invention impart to the latter extremely advantageous properties, in particular a reinforcement ability and hence a wear resistance capacity at least equal to that obtained with carbon black, which was hitherto unknown with the silicon carbides conventionally used in the rubber compositions for tires of the prior art.

The industrial processing and the curing kinetics of the compositions of the invention, which are unexpectedly comparable to those of conventional rubber compositions filled with carbon black, make the reinforcing silicon carbides previously described a very advantageous alternative to using reinforcing inorganic fillers such as HD silicas.

The invention can thus be applied preferably in rubber compositions usable for the manufacture of treads for tires which have both low rolling resistance and high wear resistance, in particular when these treads are intended for tires for passenger vehicles or for industrial vehicles of the heavy-vehicle type.

TABLE 1

| filler: | A (black) | B (SiC) | C (SiC) | D (SiC) | E (SiC) | F (SiC) |
|---|---|---|---|---|---|---|
| He Density (g/ml) | 1.99 | 3.13 | 2.83 | 3.21 | 3.06 | 2.98 |
| BET surface area (m$^2$/g) | 126 | 15.8 | 72 | 2 | 71 | 104 |
| $d_w$ (nm) | 69 | 419 | 59 | 75000 (*) | 63 | 43 |
| α (μm$^{-1}$/s) | — | $2 \times 10^{-3}$ | $5.5 \times 10^{-3}$ | $8.3 \times 10^{-6}$ | $4.2 \times 10^{-3}$ | $9.8 \times 10^{-4}$ |

(*) supplier's catalogue data

TABLE 2

| Composition No. | C-1 | C-2 | C-3 |
|---|---|---|---|
| SSBR (1) | 100 | 100 | 100 |
| filler A | 50 | — | — |
| filler B | — | 78 | 78 |
| coupling agent (2) | — | — | 0.65 |
| carbon black (N330) | 6 | 6 | 6 |
| ZnO | 2.5 | 2.5 | 2.5 |
| stearic acid | 2 | 2 | 2 |
| antioxidant (3) | 1.9 | 1.9 | 1.9 |
| sulfur | 1.5 | 1.5 | 1.5 |
| accelerator (4) | 2.5 | 2.5 | 2.5 |

(1) solution SBR with 58% of 1,2-polybutadiene units; 25% of styrene; extended with 37.5% by weight of aromatic oil (or 37.5 phr of oil per 100 phr of dry SBR); Tg = −25° C.; expressed in dry SBR;
(2) TESPT ("Si69" from DEGUSSA-HÜLS);
(3) N-1,3-dimethylbutyl-N-phenylparaphenylenediamine ("Santoflex 6-PPD" from Flexsys);
(4) N-cyclohexyl-2-benzothiazylsulfenamide ("Santocure CBS" from Flexsys).

TABLE 3

| Composition No. | C-1 | C-2 | C-3 |
|---|---|---|---|
| M10 (MPa) | 15.1 | 5.8 | 6.6 |
| M100 (MPa) | 11.5 | 4.2 | 6.2 |
| M300 (MPa) | 29.4 | 7.9 | 16.6 |
| M300/M100 | 2.6 | 1.9 | 2.7 |
| breaking stress (MPa) | 23.3 | 8.7 | 13.6 |
| elongation at break (%) | 321 | 451 | 338 |
| "Bound rubber" (%) | 28 | (*) | (*) |

(*) measurement impossible (crumbled composition)

TABLE 4

| Composition No. | C-4 | C-5 |
|---|---|---|
| SSBR (1) | 100 | 100 |
| filler A | 50 | — |
| filler C | — | 70.8 |
| coupling agent (2) | — | 2.55 |

TABLE 4-continued

| Composition No. | C-4 | C-5 |
|---|---|---|
| carbon black (N330) | 6 | 6 |
| ZnO | 2.5 | 2.5 |
| stearic acid | 2 | 2 |
| antioxidant (3) | 1.9 | 1.9 |
| sulfur | 1.5 | 1.5 |
| accelerator (4) | 2.5 | 2.5 |

(1) solution SBR with 25% of 1,2-polybutadiene units; 27% of styrene; extended with 37.5% of aromatic oil (or 37.5 phr of oil per 100 phr of dry SBR); Tg = −48° C.; expressed in dry SBR;
(2) to (4) idem Table 2.

TABLE 5

| Composition No. | C-4 | C-5 |
|---|---|---|
| M10 (MPa) | 7.3 | 7.9 |
| M100 (MPa) | 6.5 | 6.9 |
| M300 (MPa) | 23.5 | 22.8 |
| M300/M100 | 3.6 | 3.3 |
| breaking stress (MPa) | 23.4 | 26.6 |
| elongation at break (%) | 385 | 440 |
| "Bound rubber" (%) | 26 | 26 |

TABLE 6

| Composition No. | C-6 | C-7 | C-8 |
|---|---|---|---|
| SSBR (1) | 100 | 100 | 100 |
| filler A | 50 | — | — |
| filler D | — | 80.25 | — |
| filler E | — | — | 76.5 |
| coupling agent (2) | — | 0.08 | 2.72 |
| ZnO | 2.5 | 2.5 | 2.5 |
| stearic acid | 2 | 2 | 2 |
| antioxidant (3) | 1.9 | 1.9 | 1.9 |
| sulfur | 1.5 | 1.5 | 1.5 |
| accelerator (4) | 2.5 | 2.5 | 2.5 |

(1) to (4): idem Table 4.

TABLE 7

| Composition No. | C-6 | C-7 | C-8 |
|---|---|---|---|
| plasticity (MU) | 91 | 56 | 92 |
| E10 (MPa) | 6.9 | 4.1 | 7.9 |
| E100 (MPa) | 6.4 | 3.9 | 7.3 |
| E300 (MPa) | 18.3 | — | 18.8 |
| E300/E100 | 2.9 | — | 2.6 |
| breaking stress (MPa) | 26.4 | 1.85 | 28.1 |
| elongation at break (%) | 361 | 219 | 375 |
| "Bound rubber" (%) | 28.6 | (*) | 29.5 |
| K (min$^{-1}$) | 0.47 | — | 0.46 |

TABLE 7-continued

| Composition No. | C-6 | C-7 | C-8 |
|---|---|---|---|
| ΔG* | 3.75 | 0.33 | 4.22 |
| tan(δ)$_{max}$ | 0.249 | 0.107 | 0.237 |

(*) measurement impossible (crumbled composition)

TABLE 8

| Composition No. | C-9 | C-10 |
|---|---|---|
| SSBR (1) | 100 | 100 |
| filler A | 50 | — |
| filler F | — | 74.5 |
| coupling agent (2) | — | 3.87 |
| ZnO | 2.5 | 2.5 |
| stearic acid | 2 | 2 |
| antioxidant (3) | 1.9 | 1.9 |
| DPG (5) | — | 0.97 |
| sulfur | 1.5 | 1.5 |
| accelerator (4) | 2.5 | 2.5 |

(1) to (4): idem Table 4;
(5) diphenylguanidine ("Vulcacit D" from Bayer).

TABLE 9

| Composition No. | C-9 | C-10 |
|---|---|---|
| M10 (MPa) | 7.13 | 9.24 |
| M100 (MPa) | 6.83 | 6.68 |
| M300 (MPa) | 24.34 | 22.39 |
| M300/M100 | 3.56 | 3.35 |
| breaking stress (MPa) | 23.57 | 28.44 |
| elongation at break (%) | 375 | 432 |
| "Bound rubber" (%) | 23.1 | 20.9 |

The invention claimed is:

1. A rubber composition comprising a diene elastomer, a reinforcing inorganic filler, a coupling agent providing the bond between the inorganic filler and the elastomer, wherein said inorganic filler comprises a silicon carbide having the following features:
   (a) a BET specific surface area of between 20 and 200 m²/g;
   (b) an average particle size by mass, noted $d_w$, of between 10 and 350 nm;
wherein said silicon carbide constitutes more than 50% by volume of total reinforcing filler and the amount of silicon carbide is greater than 50 phr.

2. The composition according to claim 1, wherein said reinforcing inorganic filler further comprises silica or alumina.

3. The composition according to claim 1, further comprising carbon black.

4. The composition according to claim 3, wherein the amount of carbon black is between 2 and 20 phr.

5. The composition according to claim 1, wherein the BET surface area is between 20 and 150 m²/g.

6. The composition according to claim 5, wherein the BET surface area lies within a range from 25 to 140 m²/g.

7. The composition according to claim 6, wherein the BET surface area is between 60 and 120 m²/g.

8. The composition according to claim 1, wherein the size $d_w$ lies within a range from 20 to 300 nm.

9. The composition according to claim 8, wherein the size $d_w$ lies within a range from 20 to 250 nm.

10. The composition according to claim 9, wherein the particle size $d_w$ is between 30 and 100 nm.

11. The composition according to claim 1, wherein the silicon carbide has a disagglomeration rate α which is greater than $1 \times 10^{-4}$ μm$^{-1}$/s.

12. The composition according to claim 11, wherein the silicon carbide has a disagglomeration rate α which is greater than $5 \times 10^{-4}$ μm$^{-1}$/s.

13. The composition according to claim 12, wherein the silicon carbide has a disagglomeration rate α which is greater than $1 \times 10^{-3}$ μm$^{-1}$/s.

14. The composition according to claim 1, wherein the coupling agent is a polysulfurised alkoxysilane.

15. The composition according to claim 1, wherein the diene elastomer is selected from among the group consisting of polybutadienes, synthetic polyisoprenes, natural rubber, butadiene-styrene copolymers, butadiene-isoprene copolymers, butadiene-acrylonitrile copolymers, isoprene-styrene copolymers, butadiene-styrene-isoprene copolymers and mixtures thereof.

16. The composition according to claim 15, wherein the diene elastomer is a butadiene-styrene copolymer (SBR) having a styrene content of between 20% and 30% by weight, a content of vinyl bonds of the butadiene fraction of between 15% and 65%, a content of trans-1,4 bonds of between 20% and 75% and a glass transition temperature of between −20° C. and −55° C.

17. The composition according to claim 16, wherein the SBR is a SBR prepared in solution (SSBR) and used in a mixture with a polybutadiene having more than 90% cis-1,4 bonds.

18. The composition according to claim 1, wherein the amount of silicon carbide is greater than 60 phr.

19. The composition according to claim 18, wherein the amount of silicon carbide is greater than 70 phr.

20. A process for obtaining a rubber composition usable for the manufacture of tires, wherein there are incorporated into at least a diene elastomer, at least a reinforcing inorganic filler and a coupling agent providing the bond between the inorganic filler and the elastomer, wherein said inorganic filler comprises a silicon carbide having the following features:
   (a) a BET specific surface of between 20 and 200 m²/g;
   (b) an average particle size by mass, $d_w$, of between 10 and 350 nm; said silicon carbide constituting more than 50% by volume of total reinforcing filler;
wherein the entire mixture is kneaded thermomechanically, in one or more stages, until a maximum temperature of between 110° C. and 190° C. is reached, and wherein the amount of silicon carbide is greater than 50 phr.

21. The process according to claim 20, wherein said reinforcing inorganic filler further comprises silica or alumina.

22. The process according to claim 20, further comprising incorporating carbon black.

23. The process according to claim 22, wherein the amount of carbon black is between 2 and 20 phr.

24. The process according to claim 20, wherein the BET surface area is of between 20 and 150 m²/g.

25. The process according to claim 24, wherein the BET surface area lies within a range from 25 to 140 m²/g.

26. The process according to claim 25, wherein the BET surface area is of between 60 and 120 m²/g.

27. The process according to claim 20, wherein the size $d_w$ lies within a range from 20 to 300 nm.

28. The process according to claim 27, wherein the size $d_w$ lies within a range from 20 to 250 nm.

29. The process according to claim 28, wherein the particle size $d_w$ is of between 30 and 100 nm.

30. The process according to claim 20, wherein the silicon carbide has a disagglomeration rate α which is greater than $1 \times 10^{-4}$ µm$^{-1}$/s.

31. The process according to claim 30 wherein the silicon carbide has a disagglomeration rate α which is greater than $5 \times 10^{-4}$ µm$^{-1}$/s.

32. The process according to claim 31, wherein the silicon carbide has a disagglomerating rate α which is greater than $1 \times 10^{-3}$ µm$^{-1}$/s.

33. The process according to claim 20, wherein the diene elastomer is selected from among the group consisting of polybutadienes, synthetic polyisoprenes, natural rubber, butadiene-styrene copolymers, butadiene-isoprene copolymers, butadiene-acrylonitrile copolymers, isoprene-styrene copolymers, butadiene-styrene-isoprene copolymers and mixtures thereof.

34. The process according to claim 20, wherein the maximum kneading temperature is between 130° C. and 180° C.

35. The process according to claim 20, wherein the amount of silicon carbide is greater than 60 phr.

36. The process according to claim 35, wherein the amount of silicon carbide is greater than 70 phr.

37. A tire comprising a rubber composition comprising a diene elastomer, a reinforcing inorganic filler, a coupling agent providing the bond between the inorganic filler and the elastomer, wherein said inorganic filler comprises a silicon carbide having the following features:
  (a) a BET specific surface area of between 20 and 200 m²/g;
  (b) an average particle size by mass, noted $d_w$, of between 10 and 350 nm;
wherein said silicon carbide constitutes more than 50% by volume of total reinforcing filler and the amount of silicon carbide is greater than 50 phr.

38. The tire according to claim 37, wherein said reinforcing inorganic filler further comprises silica or alumina.

39. The tire according to claim 37, wherein the rubber composition further comprises carbon black.

40. The tire according to claim 39, wherein the amount of carbon black is between 2 and 20 phr.

41. The tire according to claim 37, wherein the BET surface area is between 20 and 150 m²/g.

42. The tire according to claim 41, wherein the BET surface area lies within a range from 25 to 140 m²/g.

43. The tire according to claim 42, wherein the BET surface area is between 60 and 120 m²/g.

44. The tire according to claim 37, wherein the size $d_w$ lies within a range from 20 to 300 nm.

45. The tire according to claim 44, wherein the size $d_w$ lies within a range from 20 to 250 nm.

46. The tire according to claim 45, wherein the particle size $d_w$ is between 30 and 100 nm.

47. The tire according to claim 37, wherein the silicon carbide has a disagglomeration rate α which is greater than $1 \times 10^{-4}$ µm$^{-1}$/s.

48. The tire according to claim 47, wherein the silicon carbide has a disagglomeration rate α which is greater than $5 \times 10^{-4}$ µm$^{-1}$/s.

49. The tire according to claim 48, wherein the silicon carbide has a disagglomeration rate α which is greater than $1 \times 10^{-3}$ µm$^{-1}$/s.

50. The tire according to claim 37, wherein the coupling agent is a polysulfurised alkoxysilane.

51. The tire according to claim 37, wherein the diene elastomer is selected from among the group consisting of polybutadienes, synthetic polyisoprenes, natural rubber, butadiene-styrene copolymers, butadiene-isoprene copolymers, butadiene-acrylonitrile copolymers, isoprene-styrene copolymers, butadiene-styrene-isoprene copolymers and mixtures thereof.

52. The tire according to claim 37, wherein the amount of silicon carbide is greater than 60 phr.

53. The tire according to claim 52, wherein the amount of silicon carbide is greater than 70 phr.

54. A tire tread comprising a rubber composition comprising a diene elastomer, a reinforcing inorganic filler, a coupling agent providing the bond between the inorganic filler and the elastomer, wherein said inorganic filler comprises a silicon carbide having the following features:
  (a) a BET specific surface area of between 20 and 200 m²/g;
  (b) an average particle size by mass, noted $d_w$, of between 10 and 350 nm;
wherein said silicon carbide constitutes more than 50% by volume of total reinforcing filler and the amount of silicon carbide is greater than 50 phr.

55. The tread according to claim 54, wherein said reinforcing inorganic filler further comprises silica or alumina.

56. The tread according to claim 54, wherein the rubber composition further comprises carbon black.

57. The tread according to claim 56, wherein the amount of carbon black is between 2 and 20 phr.

58. The tread according to claim 54, wherein the BET surface area is between 20 and 150 m²/g.

59. The tread according to claim 58, wherein the BET surface area lies within a range from 25 to 150 m²/g.

60. The tread according to claim 59, wherein the BET surface area is between 60 and 120 m²/g.

61. The tread according to claim 54, wherein the size $d_w$ lies within a range from 20 to 300 nm.

62. The tread according to claim 61, wherein the size $d_w$ lies within a range from 20 to 250 nm.

63. The tread according to claim 62, wherein the particle size $d_w$ is between 30 and 100 nm.

64. The tread according to claim 54, wherein the silicon carbide has a disagglomeration rate α which is greater than $1 \times 10^{-4}$ µm$^{-1}$/s.

65. The tread according to claim 64, wherein the silicon carbide has a disagglomeration rate α which is greater than $5 \times 10^{-4}$ µm$^{-1}$/s.

66. The tread according to claim 65, wherein the silicon carbide has a disagglomeration rate α which is greater than $1^{-3}$ $10^{-3}$ µm$^{-1}$/s.

67. The tread according to claim 54, wherein the coupling agent is a polysulfurised alkoxysilane.

68. The tread according to claim 54, wherein the diene elastomer is selected from among the group consisting of polybutadienes, synthetic polyisoprenes, natural rubber, butadiene-styrene copolymers, butadiene-isoprene copolymers, butadiene-acrylonitrile copolymers, isoprene-styrene copolymers, butadiene-styrene-isoprene copolymers and mixtures thereof.

69. The tread according to claim 68, wherein the diene elastomer is a butadiene-styrene copolymer (SBR) having a styrene content of between 20% and 30% by weight, a content of vinyl bonds of the butadiene fraction of between 15% and 65%, a content of trans-1,4-bonds of between 20% and 75% and a glass transition temperature of between −20° C. and −55° C.

70. The tread according to claim 69, wherein the SBR is a SBR prepared in solution (SSBR) and used in a mixture with a polybutadiene having more than 90% -cis-1,4 bonds.

71. The tread according to claim 54, wherein the amount of silicon carbide is greater than 60 phr.

72. The tread according to claim 71, wherein the amount of silicon carbide is greater than 70 phr.

* * * * *